(12) United States Patent
Mohr (10) Patent No.: US 11,359,663 B2
(45) Date of Patent: Jun. 14, 2022

(54) LOCKING THUMB NUT

(71) Applicant: Ryan J. Mohr, Maple Grove, MN (US)

(72) Inventor: Ryan J. Mohr, Maple Grove, MN (US)

( * ) Notice: Subject to any disclaimer, the term of this patent is extended or adjusted under 35 U.S.C. 154(b) by 191 days.

(21) Appl. No.: 16/695,664

(22) Filed: Nov. 26, 2019

(65) Prior Publication Data

US 2020/0166072 A1 May 28, 2020

Related U.S. Application Data

(60) Provisional application No. 62/771,899, filed on Nov. 27, 2018.

(51) Int. Cl.
*F16B 39/34* (2006.01)

(52) U.S. Cl.
CPC .................. *F16B 39/34* (2013.01)

(58) Field of Classification Search
CPC ................................ F16B 39/34; F16B 37/00
USPC .................... 411/301–303, 427, 432–433
See application file for complete search history.

(56) References Cited

U.S. PATENT DOCUMENTS

| | | | | |
|---|---|---|---|---|
| 2,150,194 A * | 3/1939 | Thomas | ............. | F16B 39/34 411/301 |
| 2,286,667 A * | 6/1942 | Brooke | ............. | F16B 39/34 411/302 |
| 2,381,936 A * | 8/1945 | Sargent, Jr. | ............. | F16B 39/34 411/247 |
| 2,391,989 A * | 1/1946 | Luce | ............. | F16B 39/34 411/247 |
| 2,400,444 A * | 5/1946 | Taylor | ............. | F16B 37/064 411/302 |
| 2,477,430 A * | 7/1949 | Swanstrom | ............. | B21K 1/707 411/302 |
| 2,723,699 A * | 11/1955 | Edwin | ............. | F16B 39/34 411/302 |
| 4,749,320 A * | 6/1988 | Gutt | ............. | F16B 39/34 411/304 |
| 5,890,857 A * | 4/1999 | Herrera | ............. | F16B 31/028 411/11 |
| 6,071,052 A * | 6/2000 | Kerr | ............. | F16B 39/34 411/247 |
| 9,151,318 B2 * | 10/2015 | Herve | ............. | F16B 41/002 |
| 10,087,976 B2 * | 10/2018 | Hund | ............. | F16B 33/06 |

* cited by examiner

*Primary Examiner* — Flemming Saether
(74) *Attorney, Agent, or Firm* — Skaar Ulbrich Macari, P.A.

(57) ABSTRACT

A locking thumb nut includes a thumb nut base and a lock plate. The lock plate can be fastened to the thumb nut base with fasteners so that the lock plate can be removed from the thumb nut base and replaced with a new lock plate when the lock plate becomes worn. The thumb nut base is elongated to provide for ease of grip by the user's fingers to turn the nut and tighten it along a threaded shank of a screw. The lock plate engages the threads of the screw to prevent unintentional backing out of the thumb nut.

11 Claims, 9 Drawing Sheets

LOCKING THUMB NUT

PRIORITY

This application claims the priority benefit of U.S. Provisional Application No. 62/771,899 filed on Nov. 27, 2018, which is hereby incorporated herein by reference in its entirety.

FIELD

The present invention relates to fasteners, and more particularly to a locking thumb nut for a threaded screw.

BACKGROUND

Locking nuts utilizing a nylon or polymer insert are well known. However, such nuts are configured for use with a wrench or tool to turn them. It is not possible for one to easily turn them with one's fingers. Plus, such nuts wear out when subjected to repeated tightening and loosening operations. Once worn, they do not hold securely anymore and must be replaced. Thus, there is a need to provide a locking nut that addresses the shortcomings noted above.

SUMMARY

Provided is a locking thumb nut that includes a thumb nut base and a lock plate. The lock plate can be fastened to the thumb nut base with fasteners so that the lock plate can be removed from the thumb nut base and replaced with a new lock plate when the lock plate becomes worn. The thumb nut base is elongated to provide for ease of grip by the user's fingers to turn the nut and tighten it along a threaded shank of a screw. The lock plate engages the threads of the screw to prevent unintentional backing out of the thumb nut.

The disclosure includes a locking thumb nut. The locking thumb nut may comprise a thumb nut base and a lock plate. The thumb nut base may have an elongated body defining a proximal side and a distal side with the distal side opposing the proximal side. The lock plate is removably-secured to the distal side of the thumb nut base. The lock plate comprises a non-metal material or a metal material that is softer than the thumb nut base. An aperture is defined through the thumb nut base and the lock plate from the proximal side through the distal side and the lock plate.

The lock plate can be removably-secured to the distal side of the thumb nut base with a mechanical fastener such as one or more threaded screws.

The thumb nut base can have a longitudinal length dimension that is at least twice its lateral width dimension. A height dimension between the proximal side and the distal side of the thumb nut base can be the same as the width dimension. A perimeter of the lock plate can be coextensive with a perimeter of the thumb nut base. The thumb nut base and the lock plate can each be a rectangular shape. A perimeter of the lock plate is coextensive with a perimeter of the thumb nut base.

The lock plate can be formed of a nylon material and the thumb nut base can be formed of a metal material.

The thumb nut base can include a cylindrical extension extending from the proximal side of the thumb nut base.

The thumb nut base can define a first flat surface between the proximal side and the distal side and a second flat surface, opposite the first flat surface, between the proximal side and the distal side.

The disclosure also includes a fastener system. The system can include a thumb nut base comprising an elongated body defining a proximal side and a distal side. The distal side opposes the proximal side. A replaceable lock plate is secured to the distal side of the thumb nut base with a mechanical fastener. The lock plate comprises a non-metal material or a metal material that is softer than the thumb nut base. An aperture is defined through the thumb nut base and the lock plate from the proximal side through the distal side and the lock plate. The mechanical fastener extends through the lock plate and into the thumb nut base. The mechanical fastener can be a threaded screw.

The thumb nut base further comprises a cylindrical extension extending from the proximal side of the thumb nut base.

A screw, such as a thumb screw, can be threaded into the aperture of the thumb nut base and lock plate from a proximal side of the thumb nut base. If the screw is a thumb screw, it can comprise a thumb wheel coupled to a threaded shank.

The disclosure further includes a method of replacing a lock plate of a locking thumb nut. The method can comprise unfastening a mechanical fastener that secures the lock plate to a thumb nut base, placing a replacement lock plate against a side of the thumb nut base such that an aperture in the lock plate is centered on an aperture defined through the thumb nut base; and fastening with the mechanical fastener the replacement lock plate to the thumb nut base. The step of fastening with the mechanical fastener can comprise threading a screw through the replacement lock plate and into the thumb nut base. The method can further comprise grasping opposing sides of the thumb nut base with a thumb and a forefinger of a user.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. The various features or aspects discussed herein can also be combined in additional combinations and embodiments, whether or not explicitly discussed herein, without departing from the scope of the invention.

References to a "first" or "second," etc. of any component or surface, or portion of a component is simply for convenient description purposes and does not specific imply order unless explicitly so stated.

Dimensions and relative proportions of components are merely example embodiments and can be varied unless specifically limited in a given claim. Thus, the dimensions and scale can be varied without departing from the scope of the invention.

Referring to FIGS. 1-7, the locking thumb nut 100 comprises a thumb nut base 102 and a lock plate 104 disposed along a top side of the thumb nut base 102. The lock plate 104 is fastened to the base 102 with screws 106 or other fasteners so that the lock plate 104 can be both secured to and removed from the base 102. The lock plate 104 can thus be easily replaced with a new lock plate 104 when the lock plate becomes worn or damaged.

Figure 1:
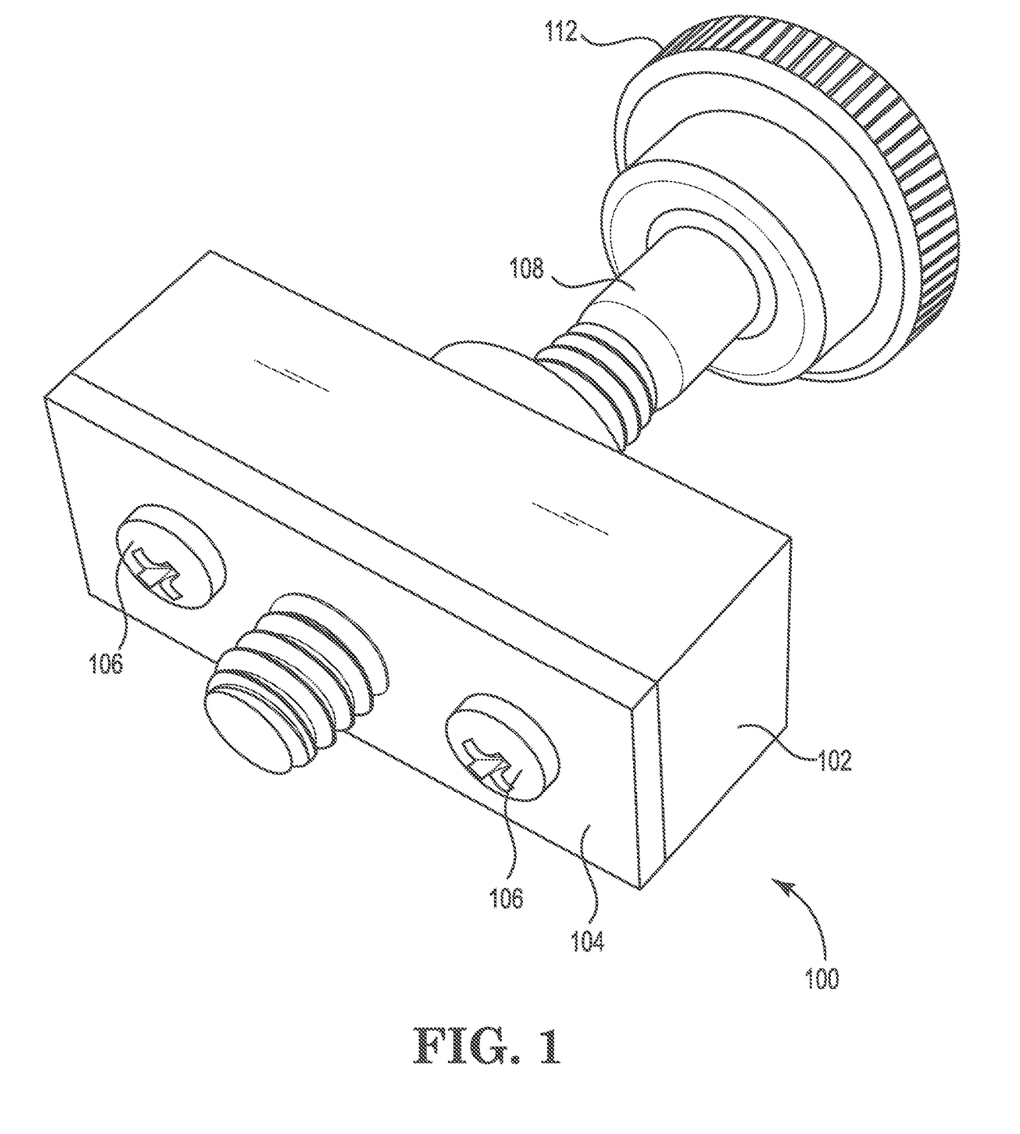
FIG. 1 is a perspective view of a thumb screw mated with a locking thumb nut according to certain embodiments.
Figure 2:
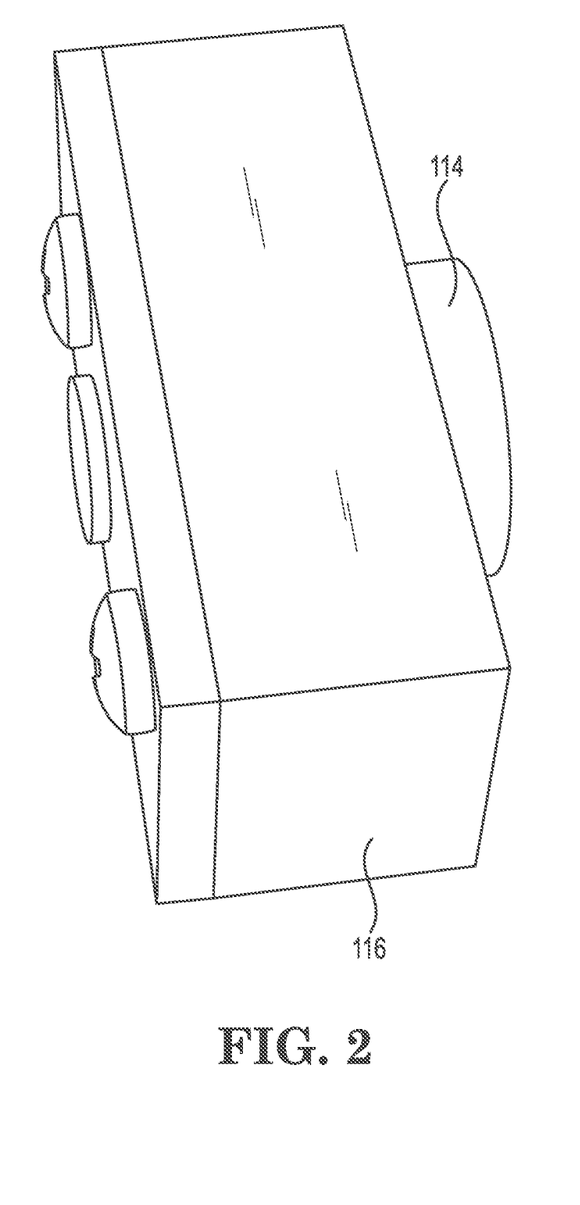
FIG. 2 is a perspective view of a locking thumb nut according to certain embodiments.
Figure 3:
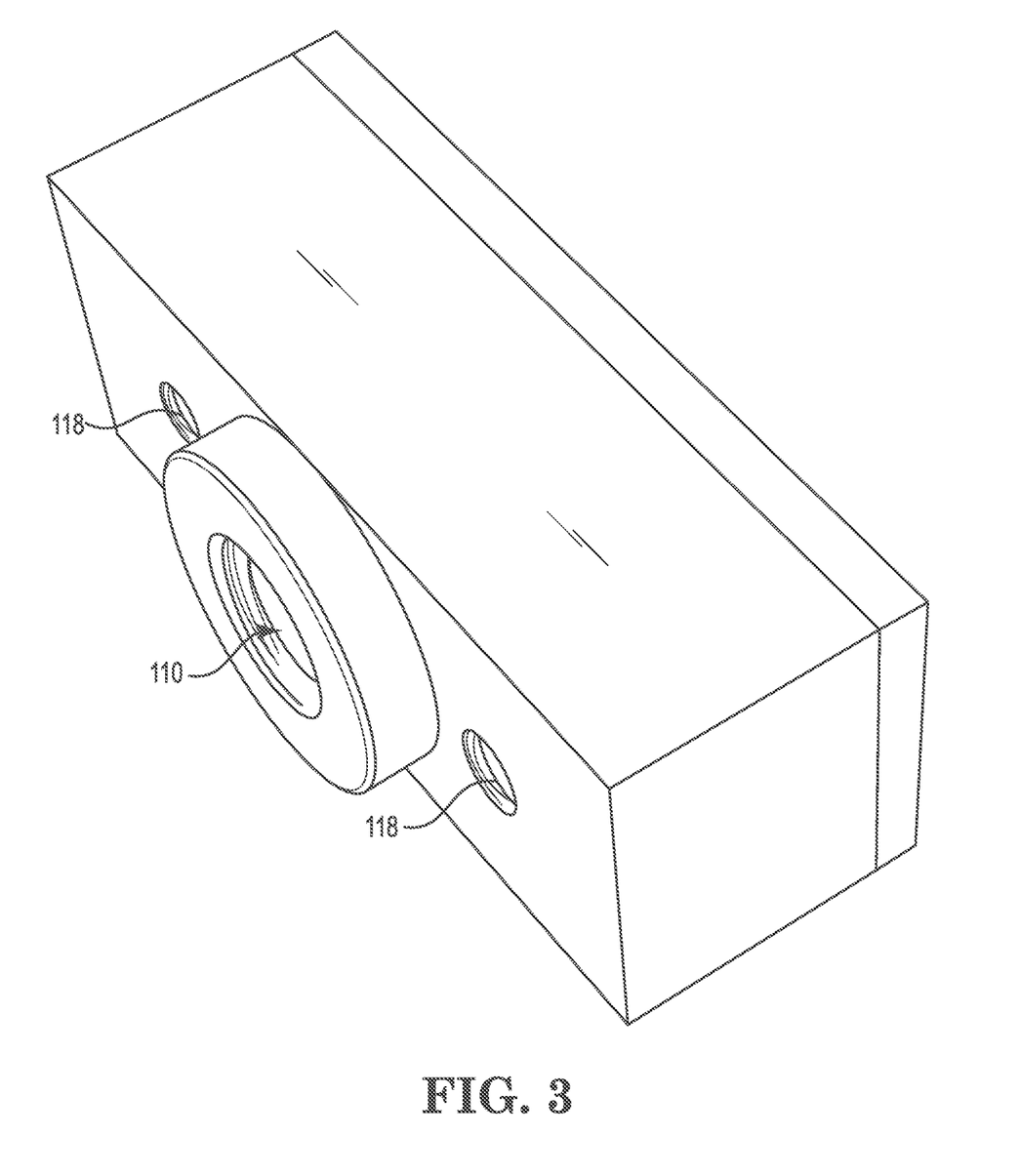
FIG. 3 is a perspective view of a locking thumb nut according to certain embodiments.
Figure 4:
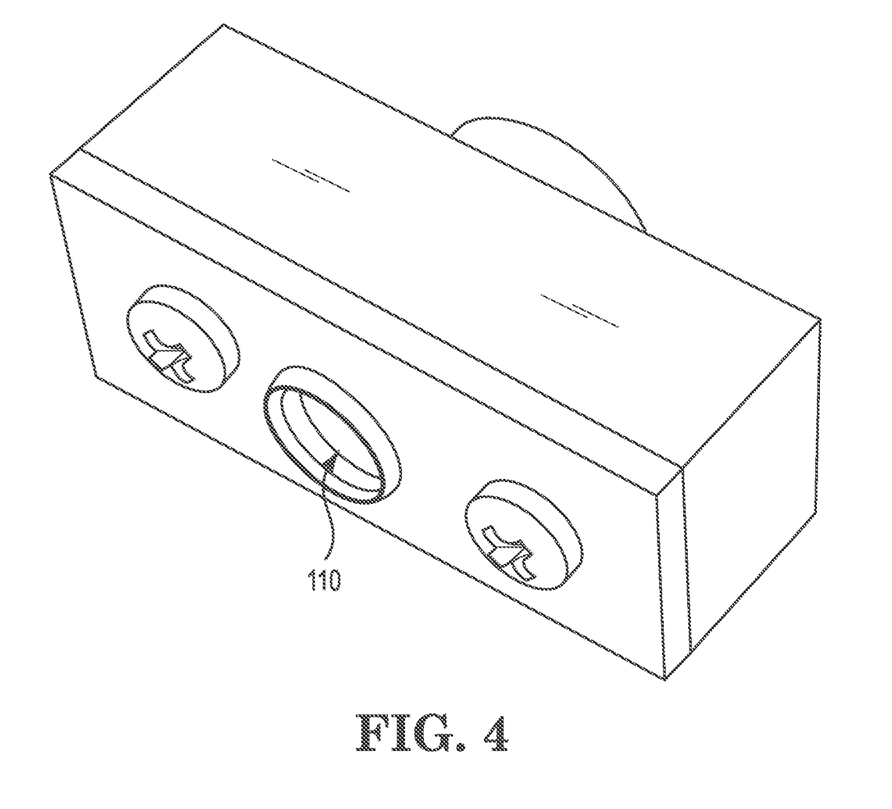
FIG. 4 is a perspective view of a locking thumb nut according to certain embodiments.
Figure 5:
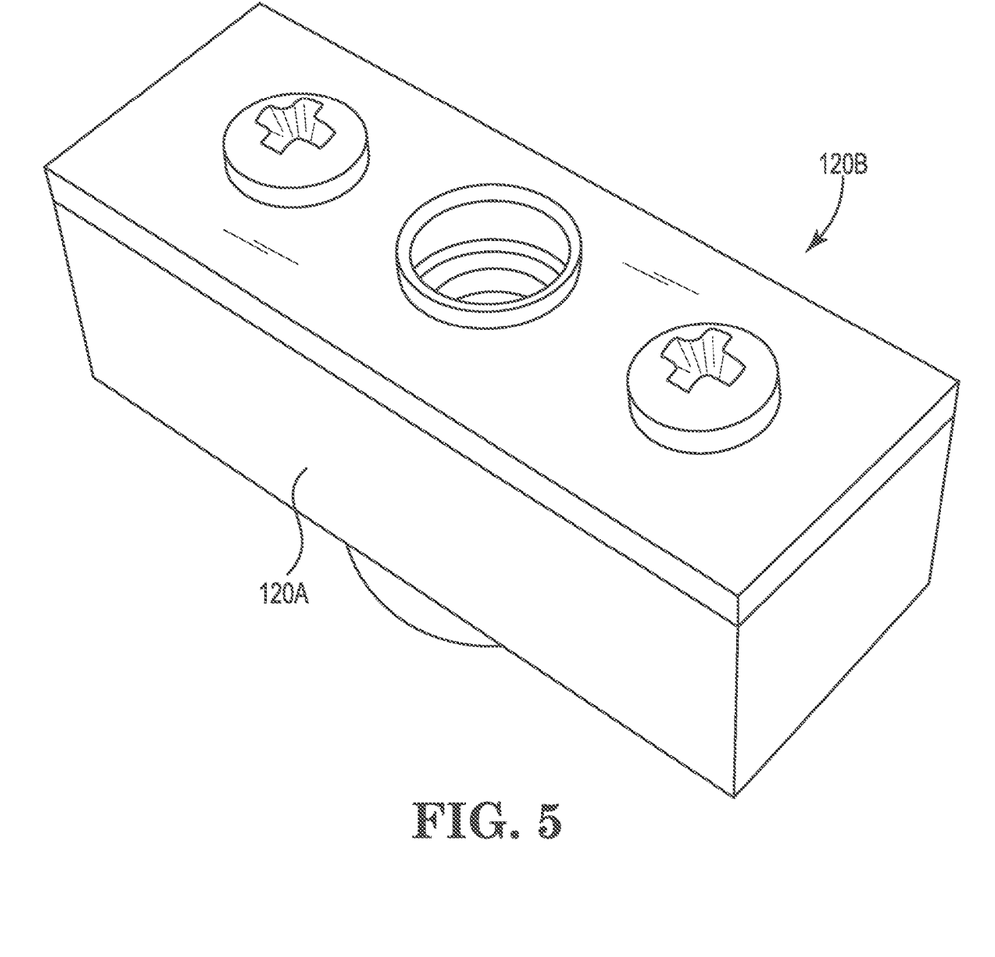
FIG. 5 is a perspective view of a locking thumb nut according to certain embodiments.

A threaded fastener such as a screw or a thumb screw 108 can be threaded through an aperture 110 that extends through the thumb nut base 102 and lock plate 104 from the proximal side to the distal side as shown in FIG. 1. The thumb screw 108 includes a thumb wheel 112 on a proximal end thereof so that the user can turn the screw 108 by hand. However, any type of threaded fastener can be used.

The proximal side of the thumb nut base 102 can define a cylindrical extension portion 114 extending proximally from a rectangular body portion 116. This can be more clearly seen in the views of FIGS. 6A, 6B and 6C. The cylindrical extension portion 114 allows for easy turning of the thumb nut base 102 when the body portion 116 bottoms out against the surface it is tightened against.

Figure 6A:
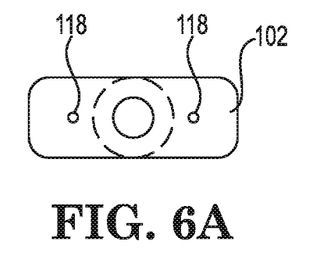
FIG. 6A is a top view of a thumb nut base according to certain embodiments.
Figure 6B:
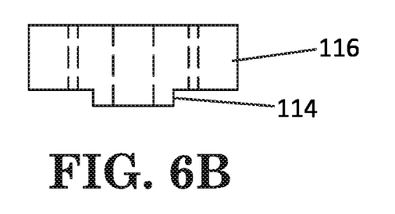
FIG. 6B is a side view of a thumb nut base according to certain embodiments.
Figure 6C:
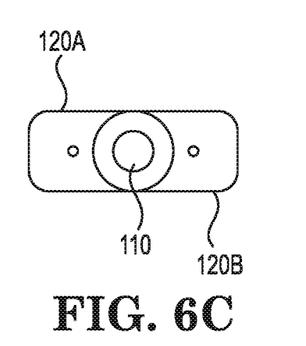
FIG. 6C is a bottom view of a thumb nut base according to certain embodiments.
Figure 7:
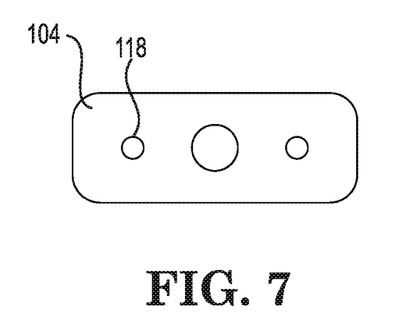
FIG. 7 is a top view of a lock plate for a locking thumb nut according to certain embodiments.

The opposing distal side of the body portion 116 defines a flat planar surface with which the lock plate 104 contacts when fastened to the body portion 116. Holes 118 for receiving the lock plate fasteners 106 are defined proximally into the body portion 116 from the distal side thereof and can even extend all the way through the body portion 116 as shown in FIGS. 6A-6C. One fastener hole 118 is defined on either side of the central aperture 110 so that the lock plate 104 does not twist when the thumb screw 108 is turned. Of course, the invention can be accomplished with a single fastener 106 if the opposite side of the lock plate 104 is secured by a tab or slot other feature defined in, or provided to, the base 102 that will hold that side of the lock plate 104.

The base 102 is an elongated shape such that it defines a longitudinal length dimension that is significantly longer than the lateral width dimension. For example, it can be appreciated from FIGS. 6A-6B that the longitudinal length dimension (e.g. 1.3 inches) is more than twice the lateral width dimension (e.g. 0.5 inches). The height dimension (proximal to distal sides) is also approximately the same as the lateral width dimension. As a result, there are opposing long flat sides 120A, 120B defined by the thumb nut base 102 so that the user can easily grip and turn the base with their fingers. The opposing long flat sides can be provided with Of course, the example dimensions mentioned above are not be limiting unless specifically recited in a given claim.

The thumb nut base 102 is preferably formed or machined of a metal material, such as an aluminum alloy. Other rigid materials such as plastics and fluoropolymers can be used, but may not have the same wear resistance as a metal material.

The locking plate 104 is an elongated planar body that defines approximately the same perimeter dimensions as the distal side of the thumb nut base 102. The plate 104 has a minimal thickness, such as 0.10 inches, but other thicknesses can be provided. Again, the dimension is not limiting unless specifically claimed in a particular claim.

The locking plate 104 is formed from a plastic material such as nylon, or a polymer that is suitable for securing the threads of a screw, so that the screw does not back out or loosen when the locking thumb nut 100 is tightened or after tightening.

In use, the threaded shank end of the screw 108 is inserted into the aperture 110 extending through the thumb nut base 102 on the proximal side thereof where the cylindrical extension portion 114 is defined. The screw 108 is advanced until the threaded shank of the screw protrudes past the lock plate 104 and the component(s) being secured by the screw 108 and locking thumb nut 100 are secured. The user can grip the flat and elongated sides 120A, 120B of the thumb nut base 102 to achieve sufficient torque to tighten the thumb nut 100 towards the screw. The process is reversed to loosen or remove the screw.

One example application of the locking thumb nut 100 is a camera mounting system such as that disclosed in U.S. Pat. No. 9,225,902 B1, which is hereby incorporated herein by reference in its entirety. The thumb nuts 118 and 136 in said patent could be replaced with the locking thumb nut 100 as disclosed herein.

Figure 8:
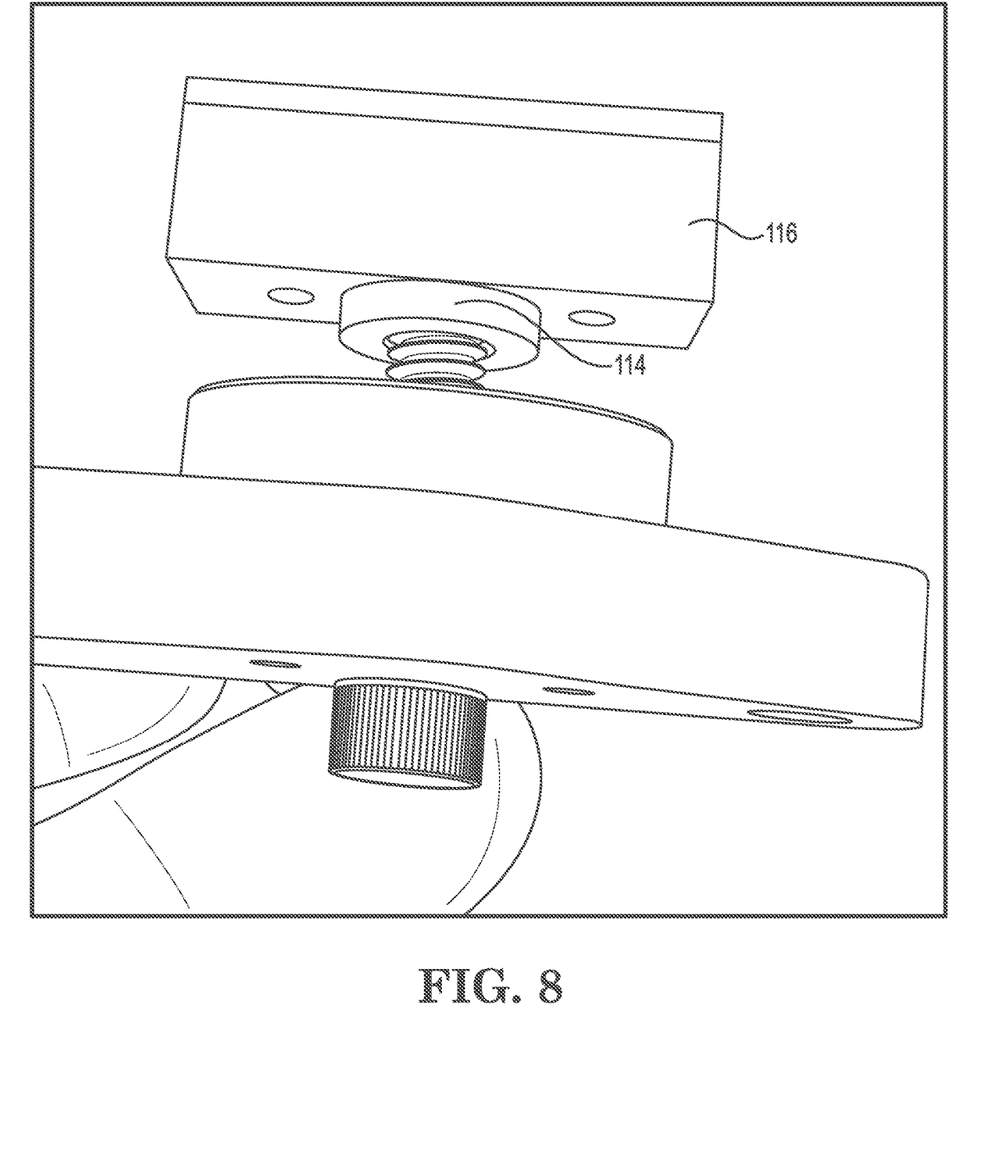
FIG. 8 is a view of the locking thumb nut partially threaded onto a camera mounting base.
Figure 9:
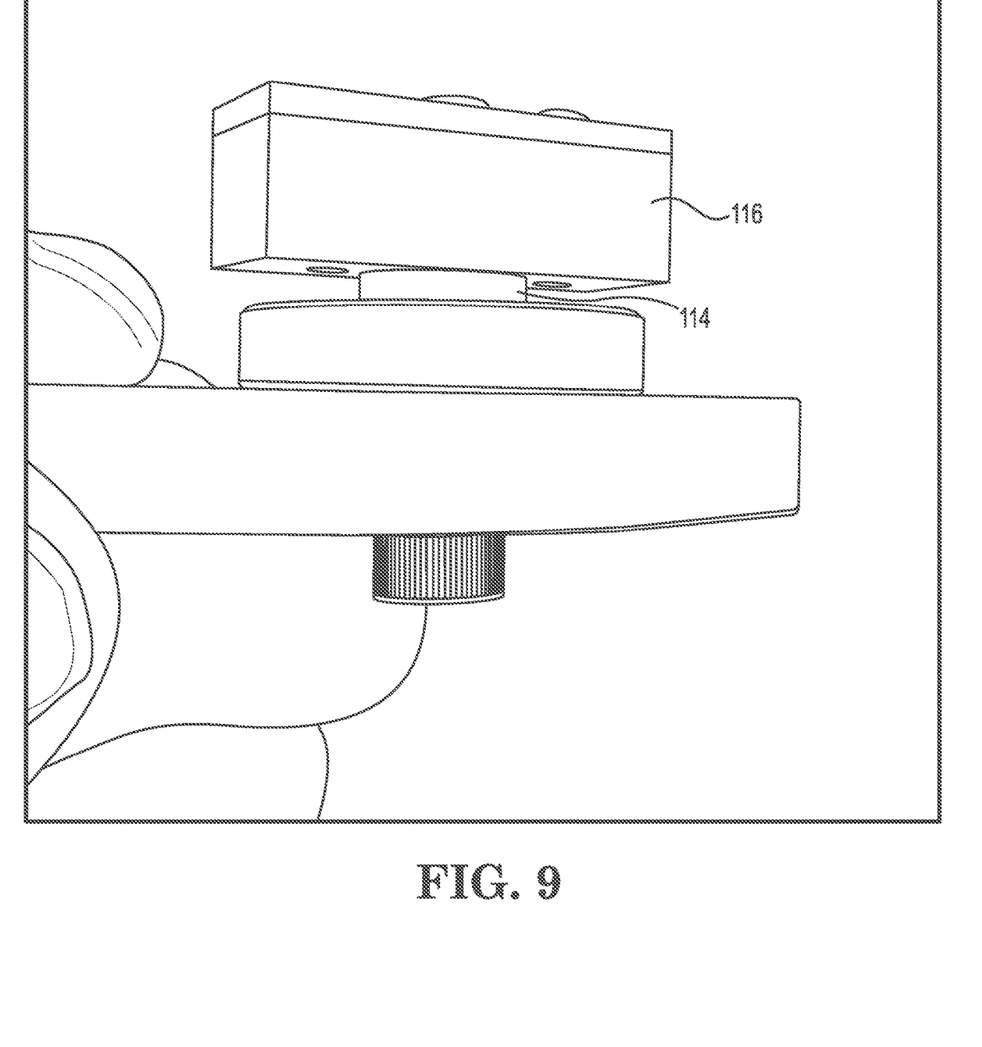
FIG. 9 is a view of the locking thumb nut threaded onto a camera mounting base.

FIGS. 8-9 show the locking thumb nut 100 being tightened onto a camera mounting base. FIG. 9 shows the locking thumb nut 100 being bottomed out.

After repeated tightening and loosening operations, the lock plate 104 material can become worn and no longer adequately function to lock the threads of the screw in place. In order to minimize replacement costs and waste of material, the lock plate 104 can be removed from the base 102 and replaced with a new lock plate 104. To do this, the user need only remove the lock plate fasteners 106 in order to remove the lock plate 104 from the thumb nut base 102. Then a new lock plate 104 can be secured to the base 102 using the lock plate fasteners 106. The locking thumb nut 100 will now function like new.

While the invention has been described in connection with what is presently considered to be the most practical and preferred example embodiments, it will be apparent to those of ordinary skill in the art that the invention is not to be limited to the disclosed example embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A fastener system, comprising:
    a thumb nut base comprising an elongated body defining a proximal side and a distal side, the distal side opposing the proximal side; and
    a replaceable lock plate secured to the distal side of the thumb nut base with a mechanical fastener, the lock plate comprising a non-metal material or a metal material that is softer than a material forming the thumb nut base,
    wherein an aperture is defined through the thumb nut base and the lock plate from the proximal side through the distal side and the lock plate,
    wherein the mechanical fastener extends through the lock plate and into the thumb nut base, and
    wherein a perimeter of the lock plate is coextensive with a perimeter of the thumb nut base.

2. The system of claim 1, wherein the mechanical fastener is a threaded screw.

3. The system of claim 1, wherein the thumb nut base further comprises a cylindrical extension extending from the proximal side of the thumb nut base.

4. The system of claim 1, further comprising a screw that is configured to be threaded into the aperture from a proximal side of the thumb nut base.

5. The system of claim 4, wherein the screw is a thumb screw comprising a thumb wheel coupled to a threaded shank.

6. A locking thumb nut, comprising:
    a thumb nut base comprising an elongated body defining a proximal side and a distal side, the distal side opposing the proximal side; and
    a lock plate removably-secured to the distal side of the thumb nut base with a threaded fastener that extends through the locking plate and into the thumb nut base, the lock plate comprising a non-metal material or a metal material that is softer than a material forming the thumb nut base,
    wherein an aperture is defined through the thumb nut base and the lock plate from the proximal side through the distal side and the lock plate, and
    wherein a perimeter of the lock plate is coextensive with a perimeter of the thumb nut base.

7. The locking thumb nut of claim 6, wherein the lock plate is removably-secured to the distal side of the thumb nut base with a plurality of threaded fasteners.

8. The locking thumb nut of claim 6, wherein the thumb nut base has a longitudinal length dimension and a lateral width dimension, and wherein the longitudinal length dimension is at least twice the lateral width dimension.

9. The locking thumb nut of claim 8, wherein a height dimension between the proximal side and the distal side of the thumb nut base is same as the width dimension.

10. The locking thumb nut of claim 6, wherein the thumb nut base further comprises a cylindrical extension extending from the proximal side of the thumb nut base.

11. The locking thumb nut of claim 6, wherein the thumb nut base defines:
    a first flat surface between the proximal side and the distal side; and
    a second flat surface, opposite the first flat surface, and between the proximal side and the distal side.

* * * * *